United States Patent
Ciak

(10) Patent No.: US 7,317,913 B2
(45) Date of Patent: Jan. 8, 2008

(54) CELL-PHONE OPERATION GIVING INCREASED FULL SERVICE IN MANUAL/SELECT MODE

(75) Inventor: Bartosz Ciak, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 209 days.

(21) Appl. No.: 11/039,925

(22) Filed: Jan. 24, 2005

(65) Prior Publication Data

US 2006/0166660 A1    Jul. 27, 2006

(51) Int. Cl.
*H04M 3/00* (2006.01)
(52) U.S. Cl. .................. 455/418; 455/432.1; 455/436; 455/440; 455/432.3
(58) Field of Classification Search ................ 455/418, 455/432.1–432.3, 435.1, 440, 436, 552, 431.1–431.3; 370/331, 332, 33
See application file for complete search history.

(56) References Cited

U.S. PATENT DOCUMENTS

| | | | | |
|---|---|---|---|---|
| 6,085,110 | A | * | 7/2000 | Nilsson .................... 455/552.1 |
| 2002/0147012 | A1 | | 10/2002 | Leung et al. |
| 2006/0003763 | A1 | * | 1/2006 | Almgren .................. 455/432.1 |

FOREIGN PATENT DOCUMENTS

| | | |
|---|---|---|
| EP | 1175119 | 1/2002 |
| GB | 2296631 | 7/1996 |

\* cited by examiner

*Primary Examiner*—Duc M. Nguyen
*Assistant Examiner*—Eric J Elcenko
(74) *Attorney, Agent, or Firm*—Anthony Asquith Corp

(57) ABSTRACT

In the manual/select mode of scanning, if the manually-selected network is not available, the phone performs a general search, and settles on a suitable alternative network. The phone is programmed to provide full call service on that found network. Upon returning home, the phone automatically switches back to home/auto scanning mode, e.g after a pre-set time, or e.g in response to detection of the home network.

8 Claims, 3 Drawing Sheets

CELL-PHONE OPERATION GIVING INCREASED FULL SERVICE IN MANUAL/SELECT MODE

The technology described herein relates to a manner of operating a (usually hand-held) wireless communication device such as a cell phone, personal digital assistant, etc, herein referred to as a cell-phone or phone.

BACKGROUND TO THE INVENTION

A cell phone user subscribes to a particular home network service (termed the Home-Net herein). The user might be able to select which one of several services to use as their home network, or the home network might be determined by the maker/seller of the phone, or the home network might be the only service available in the user's neighbourhood.

The cell phone, as manufactured, has an automatic mode and a manual mode. In automatic mode (termed home/auto mode herein), the phone sets itself automatically to search for the designated Home-Net, and to communicate only with the Home-Net, so long as the Home-Net is available. The phone is programmed to send out interrogation signals, checking to see that the Home-Net remains still available, at regular intervals (e.g every ten seconds).

The manual mode (termed manual/select mode herein) is generally used when the phone is located outside the area of the Home-Net. If the user leaves the phone in home/auto mode when roaming outside the home area, the phone continues to search for the Home-Net, but cannot find it, and so now performs general searching or scanning for some other available network.

The general search is carried out e.g once every few minutes. The operation of searching or scanning the airwaves for an—i.e any—available network consumes much more energy from the cell-phone battery than did the operation of sending out interrogation signals to the one particular Home-Net.

By switching to manual/select mode, the user can now manually select another network. This selected network (termed the Chosen-Net herein) becomes, in effect, a temporary substitute for the Home-Net. Thus, so long as the phone remains located in the Chosen-Net's geographical area, the phone sends out just the low-energy interrogation signals to the Chosen-Net, i.e does not carry out any general searching, and this minimises the drain on the battery.

Upon leaving the geographical area of the Chosen-Net, the phone still being in the manual/select mode, the phone continues trying to detect the last-selected Chosen-Net. Being in manual/select mode, and upon the last-selected Chosen-Net being no longer available, the phone traditionally is programmed to carry out a full general search every few minutes. If and when the last-selected Chosen-Net turns up, the phone will once again settle onto that; however, if the last-selected Chosen-Net is not available, but another network is available, the phone will settle onto that other network. But then, a few minutes later, the phone will carry out another general search, once again hoping to find the last-selected Chosen-Net.

It has generally been the case, with existing phones, that when the phone is in manual/select mode, but the last-selected Chosen-Net is not available, that the phone will enter an emergency-calls-only (ECO) status. That is to say, the phone will settle on an available network which has the required signal strength (termed the Found-Net herein) other than the last-selected Chosen-Net, but the phone will then only be able to make emergency calls. In ECO status, the phone cannot be used to make calls to another party or number, and cannot receive calls. Having entered ECO status, the phone still searches for the last-selected Chosen-Net; and, if the last-selected Chosen-Net should once again come to be available, that last-selected Chosen-Net will once again provide full service, i.e will serve as the temporary Home-Net.

Most cell phone service providers have a list of other service providers who are forbidden. (Often, the other provider is forbidden because the Home-Net has a geographic area that overlaps the network of the forbidden provider, making it difficult for the two providers to work out an equitable roaming agreement.) The phone is programmed so that, if the phone should be used in an area where the only network available is a forbidden network, the phone enters ECO status. That is to say, if the phone settles on the forbidden network, only the basic operation permitted by the ECO status is available, whatever the mode of the phone.

It is generally the case, with existing phones, that when the phone is in manual/select mode, and when the phone is searching for, i.e is seeking to settle on, an available network other than the last-selected Chosen-Net, the true Home-Net is not recognised as such. That is to say, the phone still continues to search for the last-selected Chosen-Net, even if the true Home-Net is now available. Thus, if a user returns home after a trip, whereby the last-selected Chosen-Net is no longer available; but leaves the network-seeking function of the phone set in manual/select mode, traditionally the phone will enter the ECO status. In order for the phone to function properly, with full call services, traditionally the user has had to switch the phone manually back to home/auto mode, whereby the phone is now programmed to search for the Home-Net, and, if it finds it, to settle on the Home-Net.

It has happened on many occasions that a user, upon returning home from a trip, and finding the phone now in the ECO status, will think there is something wrong with the phone, and will take it in for repair. That is to say, the user will not realise that the ECO status has arisen simply through their not having set the network-seeking function of the phone back to home/auto.

The invention is aimed at providing a manner of operation of the phone that is a better alternative than the phone entering ECO status in the event that (a) the last manually-selected Chosen-Net is no longer available; (b) the user fails to set the network-seeking function of the phone back to home/auto mode; and (c) other networks (perhaps including the phone's Home-Net) are available—assuming the other network is not forbidden, and does not compromise other aspects of proper functioning of the phone.

The invention resides in a personal radio communication device such as a cell-phone, preferably characterised in that:

when the device is set to manual/select mode, and a Chosen-Net has been entered into the phone;

when the device has searched for the Chosen-Net, but has failed to detect the Chosen-Net;

when the phone has performed a general search for other networks, and has settled on a Found-Net;

then the device provides full-call-service on that Found-Net.

By way of further explanation, exemplary embodiments of the invention will now be described with reference to the accompanying drawings, in which.

The apparatuses shown in the accompanying drawings and described below are examples. It should be noted that the scope of the invention is defined by the accompanying claims, and not necessarily by specific features of exemplary embodiments.

Figure 1:
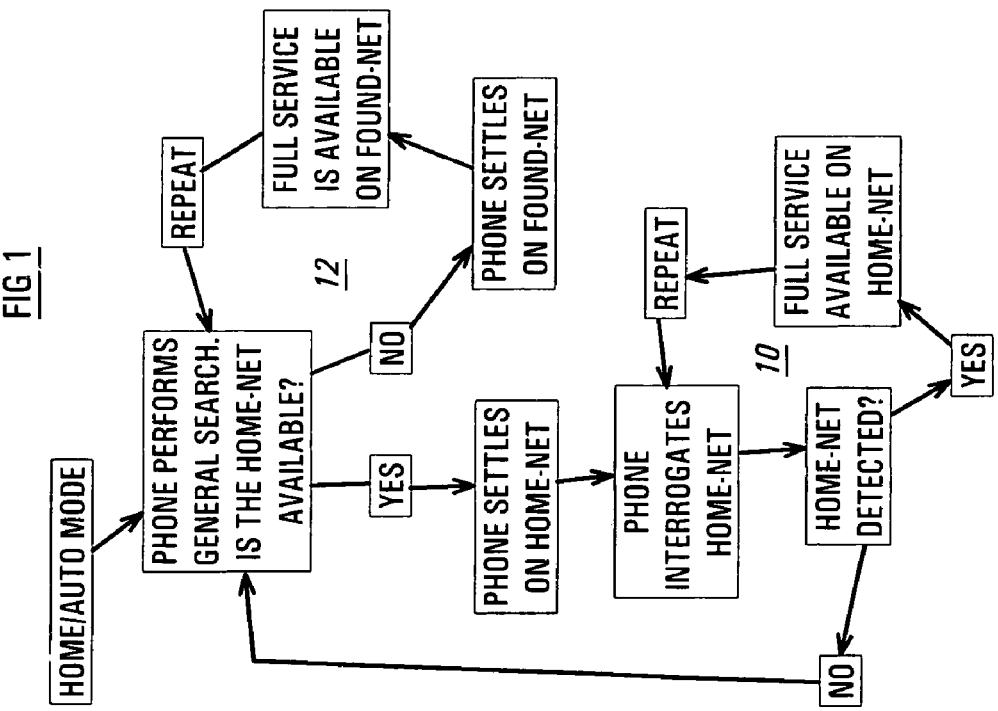
FIG. 1 is a block diagram showing the operation of a cell phone that is switched on, and is on standby (i.e not on a call), in the home/auto mode.

In FIG. 1, if the Home-Net is detected, the phone settles on the Home-Net, and the phone is available to make and receive calls on the Home-Net. After a pre-set period of time, the phone interrogates the Home-Net, and does so on a cycle that is repeated so long as the Home-Net is detected. The cycle is indicated by the loop 10 of FIG. 1.

If the Home-Net is not detected, the phone settles on another available network, being one of the networks that was detected in the general search, herein termed the Found-Net. The user can continue to make and receive calls, but now these calls are handled by the Found-Net. Most cell phones display or indicate which network they are using but, apart from that, the phone user would not be aware of this change. Operation through the Found-Net is indicated by loop 12 in FIG. 1. The phone being in home/auto mode, the phone interrogates the Home-Net (loop 10) on a pre-set cycle; if it fails to detect the Home-Net, the phone operates on loop 12.

Incidentally, it is usual for the designer to arrange for the phone, having settled on the Found-Net, for a pre-set period of time (e.g ten minutes) to perform low-energy interrogations periodically to detect the Found-Net, instead of performing high-energy general searching periodically. These interrogations of the Found-Net are not shown in FIG. 1.

Performing a general search takes much more energy from a cell-phone battery than a simple interrogation. While the cell-phone battery can cope with sending out thousands of interrogation signals, and thus can be programmed to interrogate the Home-Net every few seconds, the battery will only accommodate a few dozen general searches.

For interrogation, the pre-set cycle time is typically a few seconds. The programmer usually therefore sees to it that, if the Home-Net is not available (or if none of the networks on the Home-Net is available), the cycle time drops off until there might be several minutes between the general searches. The algorithm to do this may take account of such other factors as may be appropriate, in a more or less sophisticated manner.

The expression Home-Net, as used herein, includes the user's home network. In many cases, there are commercial agreements between service providers, whereby, if the home network itself fails to respond, the phone is programmed to cycle through a list of pre-approved sister networks, before performing a general search. It will be understood that such pre-included sister networks are, if present, included also within the scope of the expression Home-Net. Now, the cell phone is set to interrogate the pre-defined sister networks; this is extra to interrogating just a single Home-Net, but again drains far less battery power than a general search. Similarly, the expression Found-Net will be understood to include families or sets of networks, if appropriate, that have been entered into the cell-phone (usually, by being entered from the SIM-card, etc) or are otherwise associated with a particular found network.

Also, the directors of the home network may have compiled a list of pre-forbidden networks: if, when carrying out a general search, the Found-Net should turn out to be one of these forbidden networks, and if no other network is available, the phone will settle on the forbidden network, but the user is permitted now to make emergency calls only (ECO service) through that forbidden network. The cell-phone may be pre-programmed to settle onto a forbidden network, as the Found-Net, with ECO service, only if no other networks are found.

Generally, provision is made in a cell-phone for the phone to be set to a manual/select mode. This is intended to be activated when the user (and the phone) are away from home. If the phone were left in home/auto mode while roaming, the battery would drain prematurely, due to the excessive number of full or general searches.

When using manual/select mode, the designer might arrange that the user pre-selects a network (the Chosen-Net), being a network that is suitable for the region to be visited. Or (more usually), in the manual/select mode, the user might select the Chosen-Net from a list of available networks that have been discovered as a result of the phone performing a general search at the new location.

Figure 2:
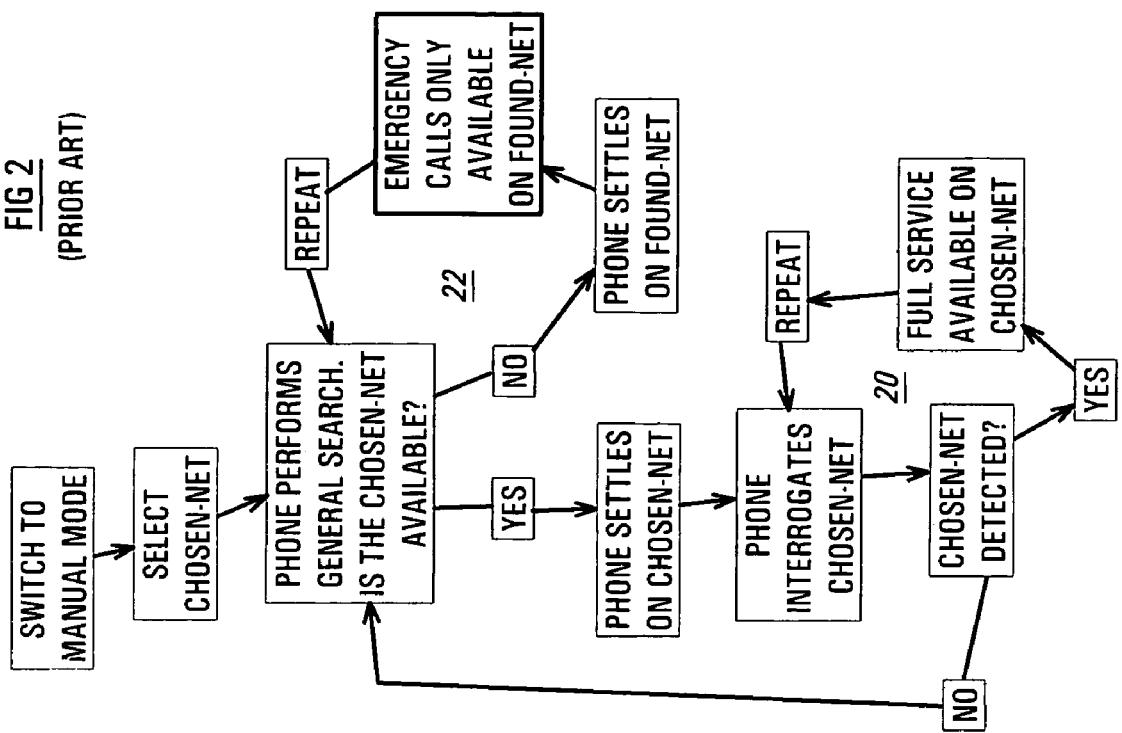
FIG. 2 is a diagram showing the operation of a cell phone when switched to manual/select mode, showing a manner of operation as may typically be encountered in the prior art.

FIG. 2 shows a typical conventional (prior art) manner in which a cell-phone operates when in the manual/select mode. If the Chosen-Net is available (at the required degree of signal strength), full call service is made available on the Chosen-Net. Thus, the phone behaves as if Chosen-Net has simply replaced Home-Net, as shown by loop 20 in FIG. 2. However, if the interrogation fails to detect the Chosen-Net, the operation now passes to the loop 22 in FIG. 2. Here, whatever network is found, as a result of the general search, the cell-phone is programmed to enter ECO status. Now, calls can only be made to 911 or other emergency number, and the phone will not accept incoming calls.

Thus, as will be understood by comparing loop 12 of FIG. 1 with loop 22 of FIG. 2, the operation of the traditional cell phone in the manual/select mode is markedly different from its operation in the home/auto mode. Traditionally, in the home/auto mode, if the Home-Net is not detected, the phone basically provides full-call-service on any available Found-Net (loop 12, FIG. 1), whereas if, in the manual/select mode, the Chosen-Net is not detected, the phone provides only the very basic ECO service on the Found-Net (loop 22, FIG. 2). It should be noted that, in manual/select mode, the traditional cell-phone descends to the ECO status even if the Found-Net is the Home-Net.

In the prior-art manual/select mode, again it will be understood that, once the interrogation function has failed to detect the Home-Net or the Chosen-Net, whereby the phone adopts ECO status according to loop 22, the algorithms dictating the resulting actions may include more or less sophisticated details. The point is that, in the prior-art manual/select mode, the phone entered the ECO status, on whatever network might be available, if the Chosen-Net was not detected. In other words, in the traditional manual/select mode, it was as if all networks were forbidden, apart from the last-selected Chosen-Net.

Upon the user manually switching the phone back to home/auto mode, the phone reverts to the manner of operation as indicated in FIG. 1. This is appropriate upon the user returning home from a trip, for example. On the other hand, the user might stay away from home, but might wish to move to another geographical region, i.e to a region where a different Chosen-Net is appropriate. In this event, the user would maintain manual/select mode, and would select another network (e.g from the available networks found as a result of a general search at the new location, or from a pre-stored list) as the Chosen-Net, whereupon operation proceeds once again as shown in FIG. 2, using the new Chosen-Net.

Figure 3:
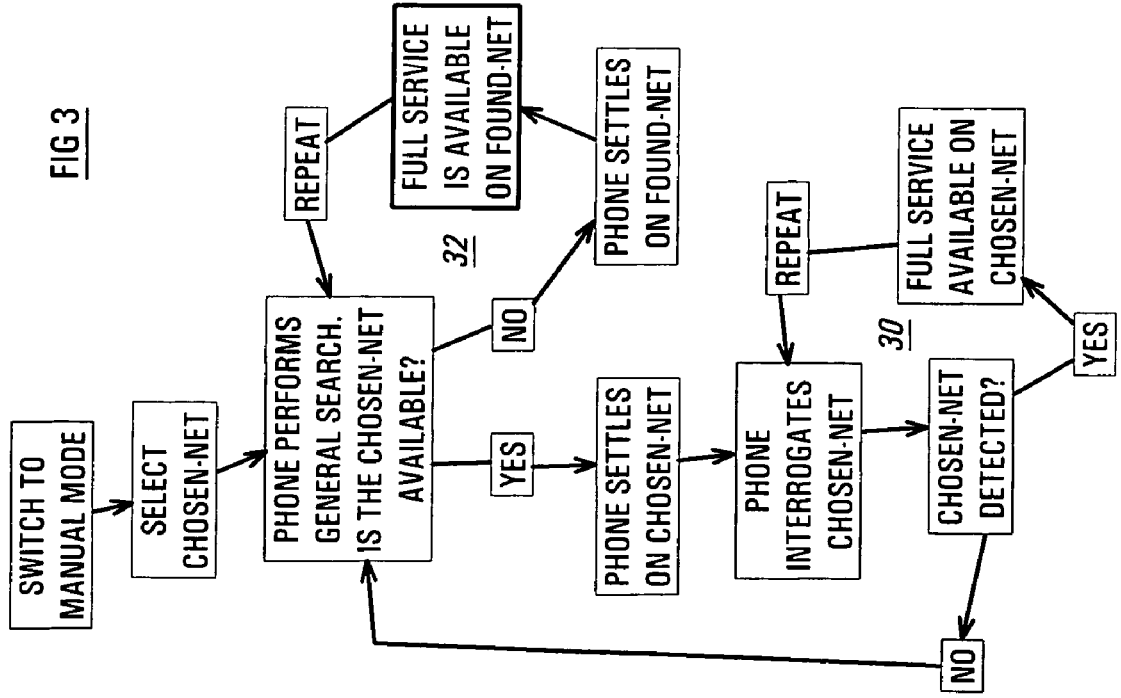
FIG. 3 is a diagram showing the operation of a cell phone when switched to manual/select mode, showing a manner of operation according to a first embodiment.

FIG. 3 illustrates a first example of the new manner of operation of a cell-phone in the manual/select mode. Here, the home/auto mode is unchanged, and the manual/select mode also is unchanged as far as the behaviour following detection of the Chosen-Net is concerned. But the actions that follow, in manual/select mode, from a failure to detect the Chosen-Net, are different, as shown in loop 32 in FIG. 3.

In loop 32 of FIG. 3, the cell-phone has failed to detect the Chosen-Net; as a result, the phone has settled onto a Found-Net. Now, as shown, the phone is programmed to provide full-call-service on that Found-Net. This full-call-service on the Found-Net on loop 32 may be compared with the ECO service on the Found-Net as shown in loop 22 of in FIG. 2.

It is recognised that, in loop 32, the battery is likely to drain prematurely, in that the phone is now called upon to carry out repeated general searches. The phone is programmed to interrogate for the Chosen-Net, not for the Found-Net, and the Found-Net is only utilised, after the general search, because the Chosen-Net is not available. (Again, the designer may arrange that the Found-Net is interrogated (on e.g a ten-second cycle) over a period of e.g ten minutes after the phone has settled thereon, i.e the general search would be done once every ten minutes.)

In fact, the phone can continue to operate in the FIG. 3 mode after the user returns home (when the Found-Net is quite likely to be the user's Home-Net). However, since the phone is still in manual/select mode, and still set to the Chosen-Net, the phone still goes through the general search routine before settling on the Home-Net as a Found-Net, which drains the battery.

It might happen that the user might forget or ignore the fact that the phone is in manual/select mode; that is to say, because full-call-service is available (loop 32 of FIG. 3), the user then might simply leave the phone in manual/select mode, indefinitely. Now, in the FIG. 3 manner of operation, the user's only alert is that the battery becomes discharged prematurely, but at least the phone can still be used. In any case, the user is alerted to the situation, in that the cell-phone inevitably gives an indication to the user that it has been set in, and still remains in, manual/select mode. Thus, it is recognised that, in the case where a cell-phone is inadvertently left in manual/select mode, the fact that the battery loses charge prematurely (loop 32, FIG. 3) is a lesser disadvantage than the fact of only having ECO available (loop 22, FIG. 2).

On the other hand, in the conventional system of FIG. 2, the fact that only the basic ECO status was available served as an immediate alarm, alerting the user to the fact that something is wrong. While a rapidly discharging battery also indicates that something is wrong, it does so with much less immediacy and urgency. However, when the conventional phones descended to ECO status, many users, while certainly recognising that something was wrong, failed to associate the descent to ECO status with the need to cancel manual/select mode. That is to say: the use of ECO status as a warning to the user to cancel the manual/select mode was really only useful to knowledgeable and well-practised cell-phone users, and was of little use to the casual or non-trained user.

It is recognised as more appropriate for the designer to arrange that a rapid loss of battery charge should be the preferred penalty for failing to switch back from manual/select mode, as opposed to the almost-complete negation of phone service. (Of course, it would be better still for the user to manually cancel manual/select mode, and switch back to home/auto mode—or to remain in manual/select mode and switch to another Chosen-Net. But it is a fact that many users, despite the fact that they carefully switched the phone to manual/select mode upon starting the trip, do tend to omit to reset the phone to home/auto mode on their return.)

By contrast, users who travel regularly do come to associate rapid battery discharge with the phone being in the wrong mode, in which the phone is performing far too many repeated general searches. Regular travellers know that switching the phone to manual/select mode is preferred, when away, in order that the phone performs low-energy interrogations of the Chosen-Net, rather than performing high-energy general searching. So, at least to the regular traveller, a sudden decline in the ability of the battery to hold charge would be likely to be associated with the fact that the phone is doing too much general searching, and even a non-technical casual user comes to know that the answer to that is probably that the phone is set in the wrong mode.

Thus, although it lacks the immediacy of a descent to ECO status, premature battery discharge does serve, in many cases, as an ample warning of the fact that the phone has been left in the wrong mode.

Figure 4:
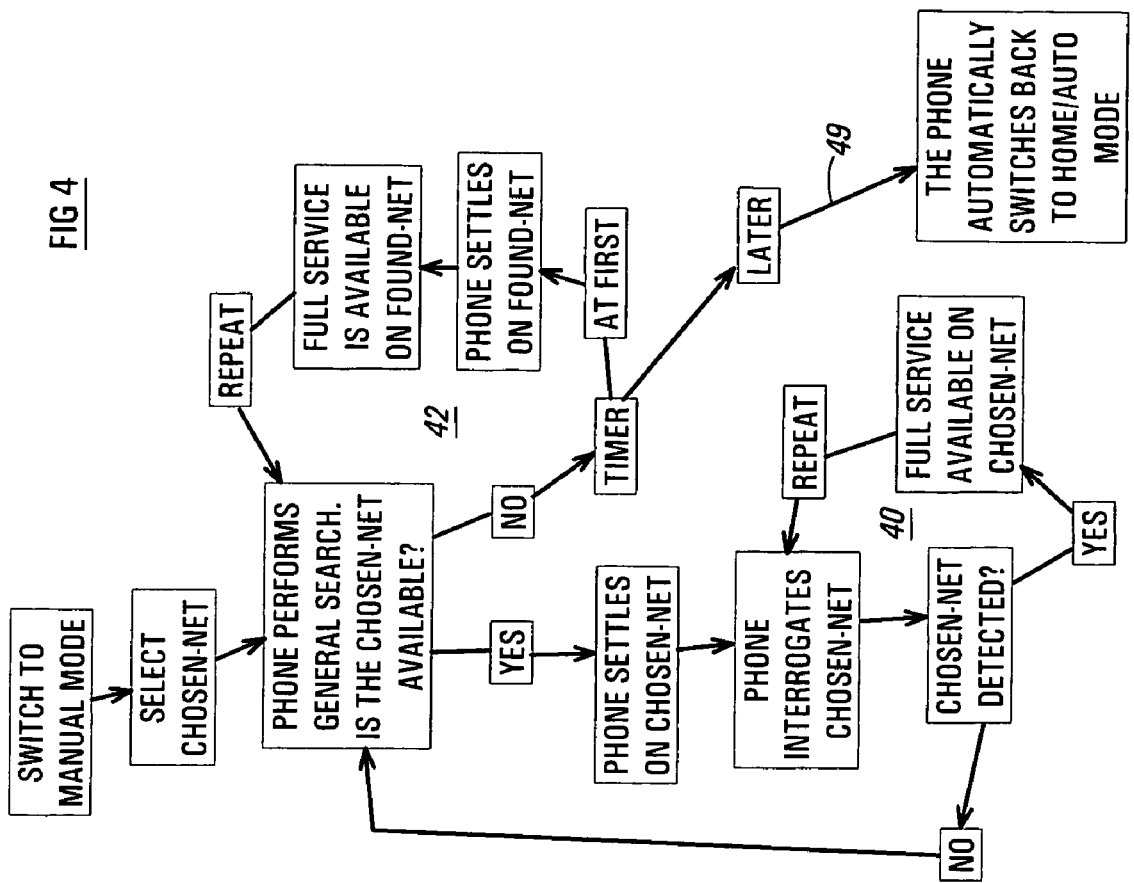
FIG. 4 is a diagram showing the operation of a cell phone when switched to manual/select mode, showing a manner of operation according to a second embodiment.

Another implementation is shown in FIG. 4. Here, the designer has arranged for the phone to revert automatically to the home/auto mode if the user inadvertently leaves the phone set to manual/select mode after returning from a trip. In FIG. 4, the phone is in manual/select mode, and the user has selected the Chosen-Net as the network appropriate to the temporary geographical location to which they are headed. So long as the Chosen-Net is detected when interrogated, the phone will behave in the manner of loop 40 in FIG. 4. Loop 40 does not involve general searching, and thus is like the loop 10 FIG. 1, loop 20 FIG. 2, and loop 30 FIG. 3.

In FIG. 4, if the Chosen-Net is not detected, the phone searches for other networks, but is programmed to keep trying to detect the Chosen-Net (loop 42 in FIG. 4). However, the phone includes a search-tracker, which is programmed also to keep a record of whether in fact the Chosen-Net is responding to the repeated searches. If the record shows that the Chosen-Net has not been detected at all during repeated searches over a period of, say, one day, the phone automatically switches over to home/auto mode. This is shown in the branch 49 of FIG. 4. Thus, if the user omits to manually switch the phone back to home/auto mode after returning from a trip, the phone automatically corrects the situation, after a period of time, in that the phone automatically switches back to home/auto mode twenty-four hours after leaving the geographic region where the Chosen-Net could be detected. Meanwhile, the phone has provided full-call-service, on whatever networks (Found-Nets) it could find, on the journey, and back home.

Upon returning home, but the FIG. 4 phone has been left in manual/select mode, in many cases the network found by the phone will be the Home-Net, which will then be designated as a Found-Net. But then, a day later, the phone will revert to Home-Net anyway, as it switches over to the home/auto mode. To repeat: if the FIG. 4 phone remains in manual/select mode, set to Chosen-Net, the phone provides full-call-service on the Home-Net, but it does so as a result of cyclically-repeated high-energy general searches; by contrast, if the phone is in home/auto mode, the phone provides full-call-service on the Home-Net using cyclically-repeated low-energy interrogations.

Again, if the user should remove the FIG. 4 phone from the geographic area of the Chosen-Net, but leaves the phone still in manual/select mode, and set to Chosen-Net, after a day the phone will automatically switch to home/auto mode (branch 49 in FIG. 4). Now, this is proper if the user has returned home. But of course, the user might instead have moved to another destination, while but still away from home. If so, the desired action is for the phone to remain in manual/select mode, and for the user to re-select the Chosen-Net as a network more appropriate to the new destination. If the user leaves the phone set to the Chosen-Net appropriate to the first destination, and then travels to a second destination, a phone that has been set up as in FIG. 4 will revert to home/auto mode, after being at the second destination (i.e after being anywhere but at the first destination) for a day. Upon that happening, the phone will operate according to loop 12 in FIG. 1, i.e the phone, having failed to detect the Home-Net, will perform battery-draining full searches, settling on whatever Found-Net might be available.

It is of course to avoid this problem that cell-phones have the option of manual/select mode. That is to say: resorting to high-energy general searches can be avoided, when roaming, by the user switching to manual/select mode and selecting a Chosen-Net appropriate to their destination. Any user who is aware enough of what they are doing to set this up once will presumably be aware enough to do it again, at the second destination. The new manner of operation, as described herein, is aimed mainly at protecting the knowledgeable user who inadvertently fails to re-set the phone to home/auto mode upon returning home—which is much more common than a knowledgeable user who inadvertently fails to select a new Chosen-Net upon moving to a new destination while travelling.

Of course, it is always possible to envisage a circumstance in which (especially the very casual) user might take the phone into a repair centre with the complaint that the battery is discharging prematurely, having failed to realise that the problem is caused by the phone remaining in an inappropriate mode setting, or if having realised that the setting is inappropriate, not knowing how to get out of that setting. The aim is to provide a simple-to-engineer response to the phone being left in the wrong setting, which caters very well for the most common circumstances and users.

Figure 5:
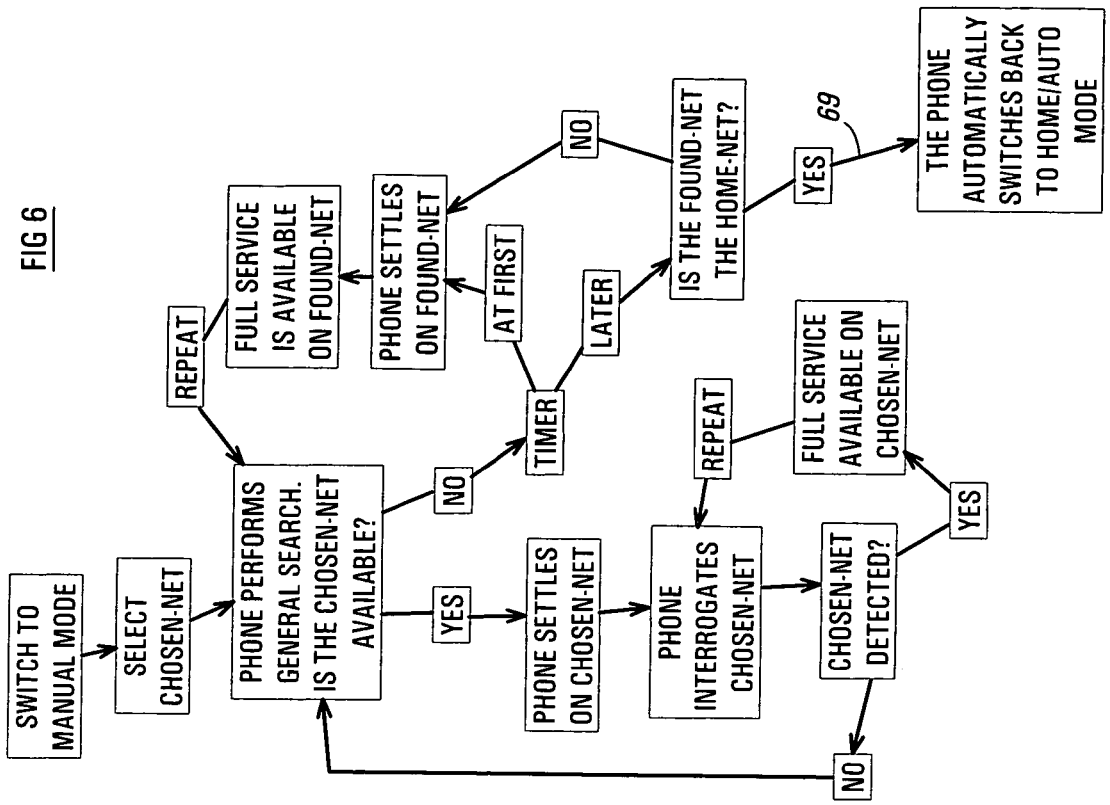
FIG. 5 is a diagram showing the operation of a cell phone when switched to manual/select mode, showing a manner of operation according to a third embodiment.

Another alternative is presented in FIG. 5. Here, the phone has been programmed to automatically switch back to home/auto mode in response (not to a timer as in FIG. 4, but) to the detection of the Home-Net. Here, again, the phone has been left in manual/select mode, but the Chosen-Net is not now being found; the phone therefore performs battery-draining general searches, looking for other networks (loop 52 in FIG. 5); if it finds one, the phone settles thereon, making that the Found-Net, in the same manner as in loop 32 of FIG. 3 and in loop 42 of FIG. 4. If, in FIG. 5, it should happen that the phone settles on the Home-Net as the Found-Net, that event triggers the phone to switch back to home/auto mode. This is shown in branch 59 of FIG. 5. Again, this is a one-time switchover; the phone does not switch cyclically between modes.

Figure 6:
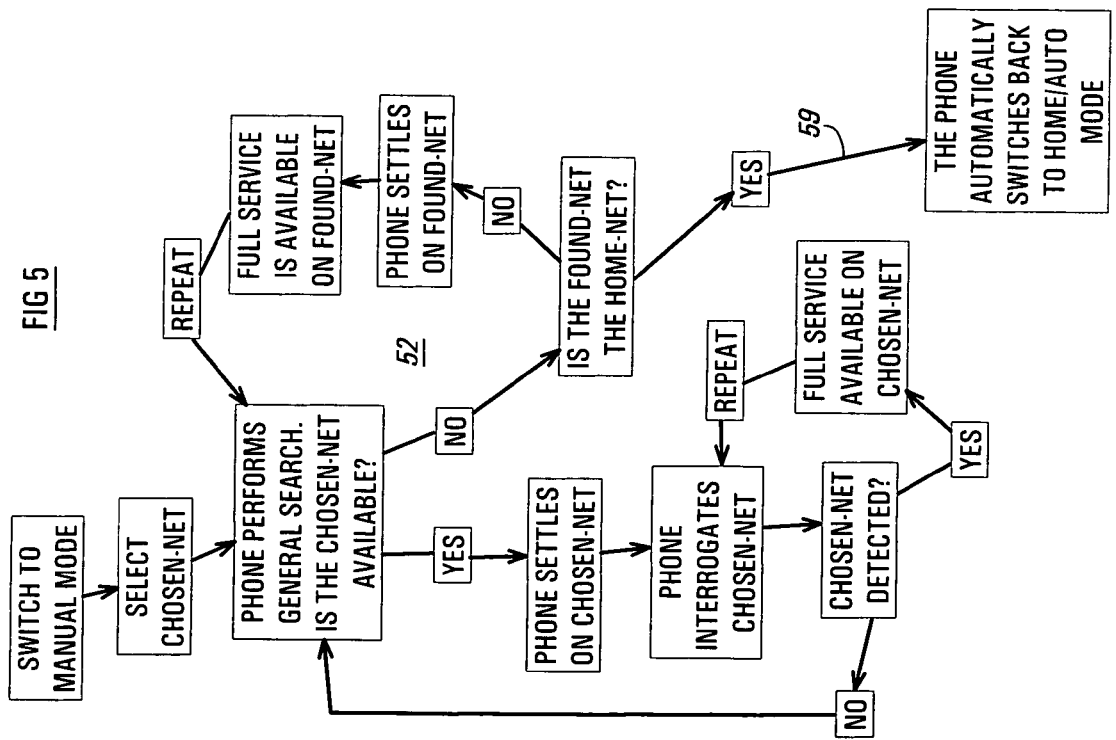
FIG. 6 is a diagram showing the operation of a cell phone when switched to manual/select mode, showing a manner of operation according to a fourth embodiment.

A further alternative is shown in FIG. 6. Here, the phone has been programmed to automatically switch back to home/auto mode upon finding the Home-Net, but only after a suitable time has elapsed. Thus, FIG. 6 combines FIG. 4 and FIG. 5. The phone enters branch 69 after the phone has failed to detect the Chosen-Net, and after a pre-set time period has elapsed.

As mentioned, a possible problem that might arise if the cell phone were to provide, in manual/select mode, the full-call-service on any Found-Net network, especially if the network that has been detected as the Found-Net is also the Home-Net, is that the user might inadvertently (or even knowingly) leave the phone in manual/select mode, whereby the continual general searches would drain the battery prematurely. Apart from the measures as described above, another way round this would be for the phone to be programmed to display an alert message (assuming of course that the phone has a display screen capable of displaying such messages) such as "Chosen-Net not detected: Select another network?". It could be arranged that if the user selects the Home-Net, the phone will automatically switch back to auto/home mode. It could also be arranged that the display might suggest which network to change to, on the basis of which network(s) had good signal strength during the most recent general search.

It will be understood that the phone "detects" a particular network, as that term is used herein, if the network is detected as being available at a pre-determinedly adequate signal strength to perform calls. Also, the device "settles" on a network, after performing a search, as that term is used herein, if the network has sufficient signal strength. If two or more networks are available at sufficient signal strength, the phone might include a programmed algorithm for choosing between them. The general rule is that the phone can settle on only one network at a time.

The terms "general searching" and "interrogation" as used herein will now be further explained. It should not be understood that communicating with the Home-Net or a Chosen-Net involves only interrogation, while communication with a Found-Net involves only general searching. Rather, communicating with a Found-Net can include some interrogation, and communicating with the Home-Net or a Chosen-Net can include some general searching. The important difference, for the purpose of this specification, is that communicating with a Found-Net involves so much general searching as to make a comparatively heavy drain on the battery, whereas communicating with the Home-Net or a Chosen-Net involves so little general searching as to make comparatively light drain on the battery. It is recognised that the difference is significant enough to warrant the measures as described in this specification.

The invention claimed is:

1. A personal radio communication device such as a cell-phone, characterised by combining the following features:
  the device is capable of providing full-call-service, in which the device can make and receive calls to and from any party without restriction;
  the device is capable of operating in a home/auto mode, in which:
    a Home-Net having been pre-programmed into the device, the device interrogates the Home-Net; and
    if the device thereupon detects the Home-Net, the device provides full-call-service on the Home-Net;
  the device is capable of operating in a manual/select mode, in which:

a network herein termed Chosen-Net having been selected, and entered into the device, the device interrogates the Chosen-Net; and if the device thereupon detects the Chosen-Net, the device provides full-call-service on the Chosen-Net;

the device includes an operable return-switch, which is effective, when operated, to switch the device from the manual/select mode to the home/auto mode;

the device is capable, upon return to the home/auto mode, and if the device thereupon detects the Home-Net, of providing full-call-service on the Home-Net;

the return-switch is operable automatically, in response to receiving a return-signal;

the device includes a search-tracker, which is programmed to report on searches for the Chosen-Net that have failed to detect the Chosen-Net;

the device includes a found-network-tracker, which is programmed to report on the identity of the networks encountered during the general search;

the device, being in the manual/select mode, is programmed to generate the return-signal in response to either one, or to both, of;

(a) a report from the search-tracker that the Chosen-Net has not been detected for a period of time T, where T is several hours; or (b) a report from the found-network-tracker that the Home-Net has been detected as the Found-Net.

2. Device of claim 1, wherein:

the device includes a manually operable select-switch, which is effective, when operated, to switch the device from the home/auto mode to the manual/select mode;

the device is so programmed that, when the select-switch is manually operated, the device makes a list of networks;

the device includes an operable network-selector, which is effective when operated to select one from the said list of networks as the Chosen-Net.

3. Device of claim 1, where T is about one day.

4. Device of claim 1, wherein the return-switch is operable also manually, to switch the device from the manual/select mode to the home/auto mode.

5. Device of claim 1, wherein, upon the device being left in the manual/select mode and being left set to a Chosen-Network which is not being found, the device is programmed:

to display a list of networks that have been found, at adequate signal strength;

to display an alert message inviting the user to select a network from the displayed list;

to switch itself back to home/auto mode if the user selects the Home-Net.

6. Procedure for operating the device of claim 1, characterised by including:

providing the device of claim 1;

switching the device to manual mode, and entering the Chosen-Net;

interrogating the Chosen-Net;

responsive to failing to detect the Chosen-Net, performing a general search;

responsive to thereupon finding the Found-Net, providing full-call-service on the Found-Net.

7. Device of claim 1, further characterised in that, the device being in the manual/select mode, and before expiry of the time T:

if the device fails to detect the Chosen-Net, the device performs a general search for another available network having a required degree of signal strength; and if, having performed the said general search, the device then settles on a network other than the Chosen-Net, herein termed a Found-Net, the device provides full-call-service on the said Found-Net.

8. Device of claim 7, further characterised in that:

the report from the search-tracker, that the Chosen-Net has not been detected for the period of time T, is one of two or more conditions both or all of which must be satisfied in order for the device to generate the said return-signal; and the report from the found-network tracker, that the Home-Net has been detected as the Found-Net, is another of the conditions which must be satisfied in order for the device to generate the said return-signal.

* * * * *